April 26, 1932.  J. C. DAMON  1,855,340
METHOD OF MAKING CONNECTIONS FOR CABLES
Filed Sept. 29, 1927
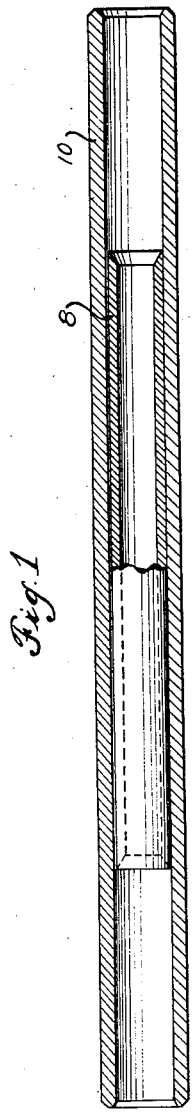
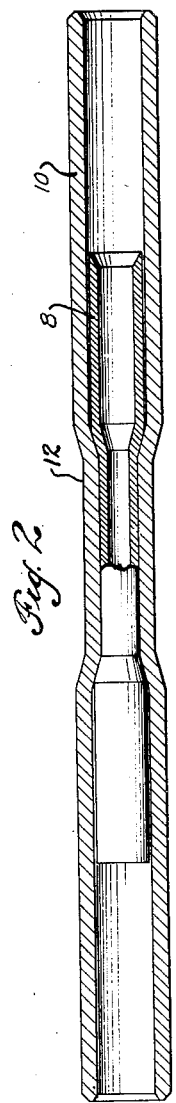
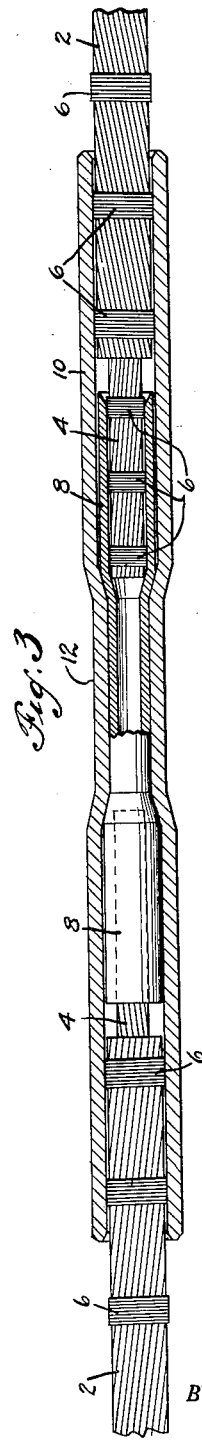
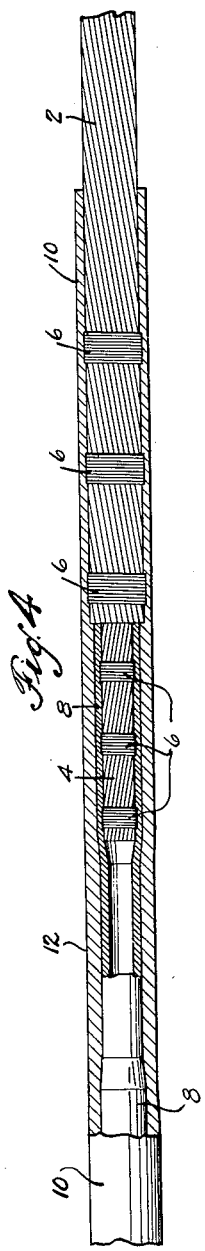
INVENTOR.
J. C. Damon
BY
ATTORNEYS.

Patented Apr. 26, 1932

1,855,340

UNITED STATES PATENT OFFICE

JOHN C. DAMON, OF CHESHIRE, CONNECTICUT, ASSIGNOR TO THE AMERICAN BRASS COMPANY, OF WATERBURY, CONNECTICUT, A CORPORATION OF CONNECTICUT

METHOD OF MAKING CONNECTIONS FOR CABLES

Application filed September 29, 1927. Serial No. 222,731.

My invention relates to a method of making connections between rods, tubes, wires, ropes and the like, hereinafter for convenience designated simply as "bodies such as cables", and further relates to an artictle of manufacture that may be produced by carrying out the method. My invention still further relates to a connector for such articles.

An object of my invention is to provide a novel and improved method of this character.

In the patent to Alfred Johann Auspitzer, No. 1,599,356, dated Sept. 7, 1926, a method of connecting cables and the like is disclosed that comprises inserting the ends of the cables or other bodies to be connected into the ends of a connector tube and then subjecting the tube to a drawing or similar mechanical action so as to cause intimate inter-engagement of the materials of the tube and the cables. In the case of relatively large cables it has been found desirable and sometimes necessary to divide the strain between the inner and outer layers of wires. To accomplish this in accordance with the method of said Auspitzer patent, the outer layer or layers of wire are unraveled to expose the ends of the inner layers or cores which are then connected by a connector tube, and then the raveled ends are replaced and are joined by a second connector tube. Thus this method requires two separate drawing or similar operations, first, on the inner connector tube and then on the outer connector tube.

The present invention contemplates a method of connecting two bodies such as relatively large cables which comprises providing said bodies with reduced end portions, inserting said end portions into two casings or tubes arranged one within the other with the inner tube surrounding said reduced end portions and the outer tube surrounding said bodies a distance beyond said reduced end portions, and simultaneously subjecting both tubes to a suitable mechanical action applied to the surface of the outer tube so as to cause intimate inter-engagement of the materials of said tubes and said bodies. It will be apparent that my improved method not only requires but a single drawing or similar operation, but also the material required is less than with said former method since the connector tubes reinforce each other and there is no space to be covered by either tube without useful purpose. It will also be apparent that there is a distinct time saving and the method is less expensive to carry out, and the completed article is a better commercial product. This method may be used in connecting a body such as a cable to various articles, and it is to be understood that my invention in its broader aspects is not limited to a method in which both ends of the connector are drawn over the ends of the articles, as in some instances one end alone of the connector may be thus applied while the other end may be connected in any other desired manner with its associated article.

Another object of my invention is to provide a novel and improved article of manufacture.

Still another object of the invention is to provide a novel and improved connector for bodies such as cables.

The several features of the invention, whereby the above mentioned and other objects may be attained, will be clearly understood from the following description and accompanying drawings, in which:

Figure 1 is a longitudinal sectional view of blanks shown assembled from which my improved connector may be formed;

Fig. 2 is a similar view illustrating one step in my improved method;

Fig. 3 is a similar view but showing the ends of two stranded cables inserted in the ends of the connector and;

Fig. 4 is a similar view showing the completed joint formed in accordance with my improved method.

My improved method is particularly adapted for use in connecting the ends of two cables 2 that are made up of a plurality of layers of strands or a cable having a central core on which the strands are laid. In either case the outer layer or layers of strands are preferably cut off a distance from the end of each cable so as to provide a reduced end portion or core 4 and the adjacent portion of the body of the cable is served with wire 6 at a plurality of points spaced apart.

The connector is formed from two casings or tubes 8 and 10, arranged one within the other, with the ends of the inner tube 8 spaced a distance from the ends of the outer tube. The outer diameter of the inner tube may be slightly less than the inner diameter of the outer tube; the inner diameter of the inner tube may be slightly greater than said reduced end portions 4 of the cable, and the inner diameter of the outer tube may be slightly greater than the diameter of the body of the cable, so as to permit these parts to be easily assembled. After the tubes are assembled they are reduced in diameter for a distance intermediate their ends as indicated at 12, Fig. 2. This may be done by swaging, rolling or any other convenient process.

The ends of the cable are then inserted in the ends of the tube until they abut the ends of said reduced portion 12 of the inner tube. When thus assembled the ends of the inner tube are spaced a distance from the shoulders formed by the junctions of the reduced portions and the bodies of the cables, and the ends of the outer tube extend a distance over the ends of said bodies.

With the connector thus applied to the ends of the cable, it is subjected to a drawing or similar mechanical action applied to the surface of the outer tube in a direction toward opposite ends thereof from its reduced intermediate portion. In thus drawing the connector over the cables any suitable means may be employed such as the apparatus illustrated and described in said patent to A. J. Auspitzer, No. 1,599,356.

Such drawing action results in intimate interengagement of the materials of the inner tube and the reduced end portions of the cables, the outer tube and the bodies of the cables, and the inner and outer tubes.

The serving of wire about the strands of the cable not only holds the strands firmly together but also the grip provided by their use with relation to the connector is improved. The spaces between the ends of the inner tube and the ends of the bodies of the cables allow for the lengthening of the inner tube during the drawing operation.

It will be apparent that my improved method is particularly advantageous in connecting cables of so many layers of strands that all the strands cannot be securely gripped from the outside without injury to some of them, and also cables having a central core. In making an installation in accordance with my improved method there is a distinct time saving. Also in my improved method less material is required and hence less working of material, and the completed article is a better commercial product than with the methods heretofore employed.

Preferably the ends of the connector tubes are chamfered off, the end of the outer tube on both the inner and outer sides and the ends of the inner tube on the inside. This chamfering of the ends of the tubes prevents the gradient of stiffness from falling off too abruptly at the ends of the tubes and reduces the tendency of the completed joint to fail at said ends. It also prevents the ends of the connector tubes from cutting into the cables so as to weaken the cables at these points.

As will be evident to those skilled in the art, my invention permits various modifications without departing from the spirit thereof or the scope of the appended claims.

What I claim is:

1. The method of connecting a body such as a cable with another article which comprises providing said body with a reduced end portion, inserting said end portion into two casings arranged one within the other with the inner casing surrounding said reduced end portion and the outer casing surrounding said body a distance beyond said reduced end portion, and thereafter subjecting both casings to a suitable mechanical action applied to the surface of the outer casing so as to cause intimate interengagement of the materials of said casings and said body.

2. The method of connecting body such as a cable with another article, which comprises providing said body with a reduced end portion, inserting said end portion into two casings arranged one within the other, the inner casing surrounding said reduced end portion with its end spaced a distance from the inner extremity of said reduced end portion, and the outer casing surrounding said body a distance beyond said end portion, the portion of said inner casing surrounding said reduced end portion being of substantially the same external diameter as said body beyond said end portion, and thereafter subjecting both casings to a suitable mechanical action applied to the surface of the outer casing so as to cause intimate interengagement of the materials of said casings and said bodies.

3. The method of connecting a cable made up of strands with another article, which comprises serving wire about one end portion of the cable at a plurality of spaced points, inserting said end portion of the cable into a casing, and thereafter subjecting the casing to a suitable mechanical action so as to cause intimate interengagement of the materials of said casing and said cable and servings of wire.

4. The method of connecting a cable having a core and strands surrounding the core with another article, which comprises cutting off said strands to expose an end portion of the core, inserting said end portion into two casings arranged one within the other with the inner casing surrounding said end portion of the core and the outer casing surrounding said strands a distance beyond said end portion, and thereafter subjecting both casings to a suitable mechanical action applied to the surface of the outer casing so as to cause intimate interengagement of the materials of said casings and said cable.

5. The method of connecting the ends of bodies such as cables, which comprises providing opposed ends of said bodies with reduced end portions, inserting said end portions into opposite ends, respectively, of two casings arranged one within the other with the inner casing surrounding both of said reduced end portions for a substantial distance and the outer casing surrounding said bodies a distance beyond said reduced end portions, and thereafter subjecting both casings to a suitable mechanical action applied to the surface of the outer casing so as to cause intimate interengagement of the materials of said casings and said cable.

6. The method of connecting the ends of bodies such as cables, which comprises providing two casings arranged one within the other with the ends of the inner casing spaced a distance inwardly from the ends of said outer casing, reducing the diameter of said casings for a distance intermediate their ends, providing opposed ends of said bodies with reduced end portions of greater length than the distance between the ends of the reduced portion of the inner casing and the ends thereof, inserting said end portions of the bodies into opposite ends of the casings with the ends thereof abutting the ends of the reduced portion of the inner casing, the outer casing surrounding said bodies a distance beyond said reduced end portions, and subjecting both casings to a suitable mechanical action applied to the outer casing in opposite directions so as to cause intimate interengagement of the materials of said casings and said cable.

In testimony whereof, I have signed my name to this specification this twenty-fourth day of September, 1927.

JOHN C. DAMON.